United States Patent [19]
Aoki et al.

[11] Patent Number: 5,483,219
[45] Date of Patent: Jan. 9, 1996

[54] ALARM SIGNAL GENERATION DEVICE FOR A VEHICLE

[75] Inventors: Hisashi Aoki; Sadao Kokubu; Yoshiyuki Mizuno; Takashi Mizuno, all of Aichi, Japan

[73] Assignee: Kabushiki Kaisha Tokai Rika Denki Seisakusho, Aichi, Japan

[21] Appl. No.: 178,561

[22] Filed: Jan. 7, 1994

Related U.S. Application Data

[63] Continuation of Ser. No. 149,341, Nov. 9, 1993, abandoned.

[30] Foreign Application Priority Data

Nov. 10, 1992 [JP] Japan ..................................... 4-299935

[51] Int. Cl.$^6$ .................................................. B60R 25/10
[52] U.S. Cl. .......................... 340/426; 340/552; 340/554; 367/94
[58] Field of Search .................................... 340/426, 552, 340/554; 367/94

[56] References Cited

U.S. PATENT DOCUMENTS 3,925,773 12/1975 Green ......................................... 367/94
4,322,722 3/1982 Kozdon .................................... 340/554

FOREIGN PATENT DOCUMENTS 5542336 10/1981 Japan .

*Primary Examiner*—Brent A. Swarthout
*Assistant Examiner*—Edward Lefkowitz
*Attorney, Agent, or Firm*—Finnegan, Henderson, Farabow, Garrett & Dunner

[57] ABSTRACT

It is an object of the invention to provide a vehicle alarm signal generation device which can realize the reduction of the consumption of power without unstabilizing the intruder detect operation. The vehicle alarm signal generation device includes a supersonic sensor which comprises a supersonic transmitter and a supersonic receiver. The supersonic transmitter radiates supersonic waves in the interior of a vehicle and the radiated supersonic waves are received by the supersonic receiver. If any person intrudes on the vehicle interior, then there is produced a difference between the frequencies of the radiated and received supersonic waves due to the Doppler effect generated responsive to the movements of the intruder, so that a beat frequency signal corresponding to the frequency difference is included in a signal received by the supersonic receiver. The beat frequency signal is integrated by an integrating circuit and is then converted into a voltage signal. A control circuit is arranged such that it generates an alarm signal when the voltage signal arrives at or goes beyond a reference level. The control circuit drives the supersonic sensor intermittently, invalidates the voltage signal for a given time after it starts the driving of the sensor and, after lapse of the invalidated time of the voltage signal, switches the supersonic sensor into its successive driving condition when the voltage signal reaches or exceeds an auxiliary reference level lower than the reference level.

3 Claims, 3 Drawing Sheets

_5,483,219_

ALARM SIGNAL GENERATION DEVICE FOR A VEHICLE

This application is a continuation of U.S. patent application Ser. No. 08/149,341, filed Nov. 9, 1993, now abandoned.

BACKGROUND OF THE INVENTION

1. Field of the Invention

The present invention relates to an alarm signal generation device for a vehicle which detects an intruder on the interior of a vehicle by use of a supersonic sensor to give an alarm.

2. Related Art

In recent years, as an intruder alarm device for prevention of crimes in a vehicle, there has been put to practical use an alarm signal generation device which uses a supersonic sensor. That is, in such alarm signal generation device, there is provided in the vehicle interior a supersonic sensor which includes a supersonic generator for radiating supersonic waves and a supersonic receiver for receiving the supersonic waves reflected in the vehicle interior, and an alarm signal is generated by use of the Doppler effect of the reflected supersonic waves responsive to the movements of the intruder. In particular, while the intruder is moving, the Doppler effect produces a difference between the respective frequencies of the radiated and reflected supersonic waves and, for this reason, a beat frequency signal corresponding to the above frequency difference is included in the signal that is received by the supersonic receiver. Thus, such frequency signal is integrated by an integrating circuit to thereby generate a voltage signal and, when the voltage signal arrives at or goes beyond a given reference level, then the alarm signal is generated.

In the above-mentioned conventional alarm signal generation device, the supersonic sensor is driven successively, which consumes a relatively large amount of current. Therefore, in a condition in which a vehicle is to be parked continuously for a long time, there is a possibility of so called run-down of a battery. To cope with such problem, for example, it can be expected to employ a structure that the supersonic sensor is driven intermittently. However, since the supersonic sensor has a nature that the output frequency thereof is unstabilized in the early start time of driving thereof, if there is simply employed the structure to drive the supersonic sensor intermittently, then there arises a problem that the detection operation of the supersonic sensor cannot be stabilized.

SUMMARY OF THE INVENTION

In view of the foregoing problem, it is an object of the invention to provide an alarm device which can realize the reduction of the consumption of power without unstabilizing the detection operation.

In attaining the above object, according to the invention, there is provided an alarm signal generation device for a vehicle including in the interior of the vehicle a supersonic sensor including a supersonic transmitter for radiating supersonic waves and a supersonic receiver for receiving the radiated supersonic waves, an integrating circuit for integrating a beat frequency signal corresponding to a difference between the frequencies of the radiated and received supersonic waves to generate a voltage signal, and a control circuit for generating an alarm signal when the voltage signal reaches a reference level. The control circuit is arranged in such a manner that it can drive the supersonic sensor intermittently, can invalidate the voltage signal for a given time period in each of the starting time periods of the intermittent sensor drivings, and can switch the supersonic sensor into the successive driving condition thereof when the voltage signal arrives at or goes beyond an auxiliary reference level lower than the reference level after the lapse of the invalidation time therefor.

According to the invention, if the supersonic sensor is driven, then supersonic waves are radiated into the interior of a vehicle from the supersonic transmitter and, at the same time, the radiated supersonic waves are reflected in the vehicle interior and is then received by the supersonic receiver. In such driving condition, if any person intrudes on the vehicle interior, there is produced a Doppler effect responsive to the movements of the intruder and, due to the Doppler effect, a beat frequency signal corresponding to a difference between the frequencies of the radiated and received supersonic waves is included in a signal received by the supersonic receiver. The beat frequency signal is integrated by the integrating circuit and is converted to a voltage signal. When the voltage signal equals or exceeds a reference level, the control circuit generates an alarm signal.

In this case, because the supersonic sensor is driven intermittently by the control circuit, the consumption of power is reduced. In the beginning time period of the driving of the supersonic sensor, there occurs a phenomenon that the output frequencies of the supersonic sensor are unstabilized. However, according to the invention, since the voltage signal output from the integrating circuit is invalidated by the control circuit for a given time period after the driving of the supersonic sensor is started, there is eliminated the possibility that the detect operation of the intruder on the basis of the level of the voltage signal can be unstabilized. Also, the control circuit, as described above, after the lapse of the invalidation time of the voltage signal, switches the supersonic sensor into its successive driving condition when the voltage signal from the integrating circuit reaches or exceeds an auxiliary reference level which is lower than the above reference level, thereby positively making it possible to positively execute the detection operation of the intruder on the vehicle interior.

DETAILED DESCRIPTION OF THE PREFERRED EMBODIMENTS

Now, description will be given hereinbelow of an embodiment of an alarm signal generation device according to the invention with reference to the accompanying drawings.

Figure 4:
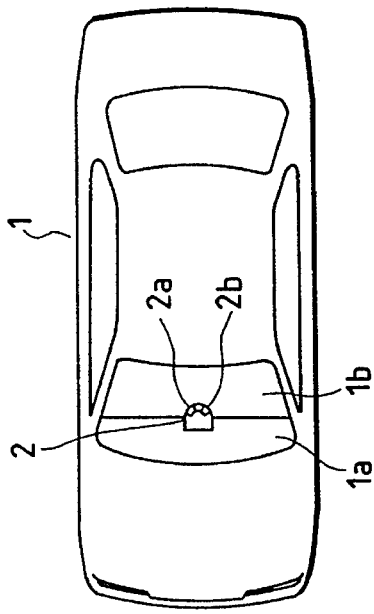
FIG. 4 is a plan view of a car with a vehicle alarm signal generation device.

In FIG. 4, in the central portion of a dashboard 1a provided in a car 1 which is used here as an example of a vehicle, there is mounted and fixed a supersonic sensor 2 (shown in an exaggerated manner) which is disposed to face backwardly. The supersonic sensor 2 includes a supersonic transmitter 2a and a supersonic receiver 2b respectively containing therein piezoelectric elements and a given angle (on the order of 90°) exists between the respective central axes of the transmitter 2a and receiver 2b. And, if the supersonic sensor 2 is driven, then supersonic waves are radiated into the car interior 1b from the supersonic transmitter 2a and, at the same time, the supersonic waves reflected in the car interior 1b are received by the supersonic receiver 2b.

Figure 1:
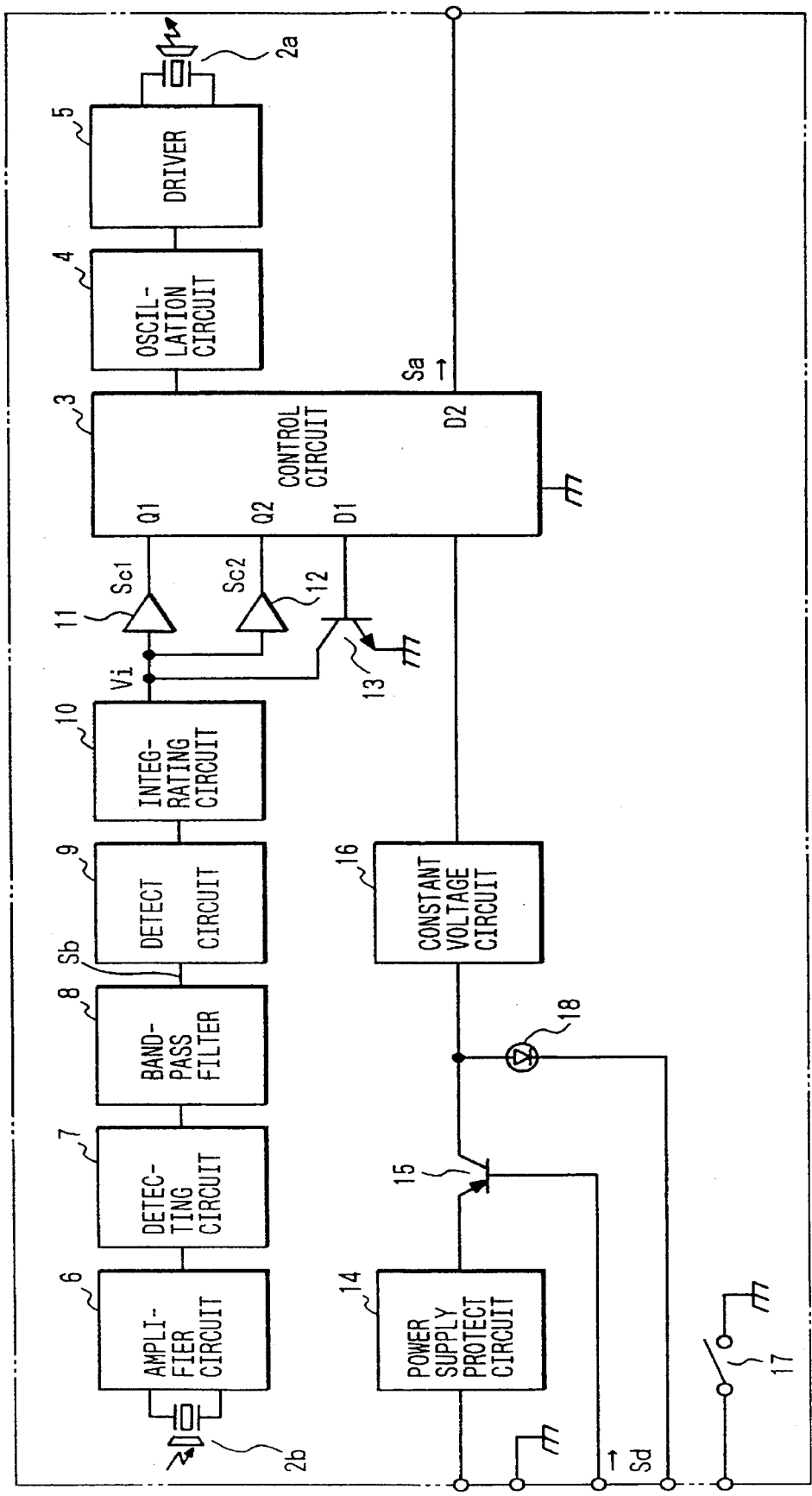
FIG. 1 is a circuit diagram of an embodiment of a vehicle alarm signal generation device according to the invention.

Referring now to FIG. 1 which shows a circuit diagram of an electric structure of an embodiment of an alarm signal generation device according to the invention, the supersonic transmitter 2a of the supersonic sensor 2 is arranged such that it can be driven by an instruction from a control circuit 3 including a microcomputer through an oscillation circuit 4 and a driver 5, and the output frequency of the supersonic transmitter 2a is set to be, for example, on the order of 40 KHz.

The received signal received by the supersonic receiver 2b of the supersonic sensor 2 is given through an amplifier circuit 6, a detect circuit 9, a bandpass filter 8 and a detect circuit 9 to an integrating circuit 20. In this case, the bandpass frequency (the central value) of the bandpass filter 8 is set for 100 Hz and the grounds for this setting are as follows:

That is, in a state in which the supersonic waves radiated from the supersonic transmitter 2a are reflected in the car interior 1b and are received by the supersonic receiver 2b, if any person intrudes on the car interior 1b, then there is produced the Doppler effect responsive to the movements of the intruder and, due to the Doppler effect, a beat frequency signal Sf corresponding to a difference between the frequencies of the radiated and reflected supersonic waves is included in a signal received by the supersonic receiver 2b. In this case, when a sonic velocity is expressed as V, the speed of the movement of the intruder is expressed as Vo (the approaching direction is assumed to a positive value), and the output frequency of the supersonic transmitter 2a is expressed as fs, the frequency f (that is, the Doppler frequency) of the supersonic wave to be received by the supersonic receiver 2b can be given by the following equation:

$$f = fs \times (V+Vo)/(V-Vo)$$

In this instance, when the speed of the intruder Vo is assumed to be 0.5 m/sec., then the frequency $\Delta f$ of the beat frequency signal Sf is obtained as about 100 Hz according to the following equation and the frequency $\Delta f$ obtained in this manner is set as the central value of the bandpass frequency of the bandpass filter 8. Therefore, if any person intrudes on the car interior 1b, then a component of the beat frequency signal Sf included in the signal received by the supersonic receiver 2b passes through the bandpass filter 8.

$$\Delta f = |f-fs| = 100 \text{ (Hz)}$$

On the other hand, the integrating circuit 10 includes a capacitor (not shown) as an integrating element, and is arranged such that it integrates the beat frequency signal Sf passing through the bandpass filter 8 and generates a voltage signal Vi corresponding to the integration value.

A first comparator 11, which receives the voltage signal Vi from the integrating circuit 10, compares a reference level Vs set therein with the voltage signal Vi and, when Vs< Vi, then the comparator 11 generates and applies a comparison signal Sc1 to an input terminal Q1 of the control circuit 3. A second comparator 12, which similarly receives the voltage signal Vi from the integrating circuit 10, compares an auxiliary reference level Vs' (which is set lower than the reference level Vs) set therein with the voltage signal Vi and, when Vs'<Vi, then the comparator 12 generates and applies a comparison signal Sc2 to an input terminal Q2 of the control circuit 3.

Also, an npn type transistor 13 is controlled, that is, the transistor 13 is turned on and off, by means of a signal sent from on output terminal D1 of the control circuit and, when it is on, the transistor 13 discharges the electric charges of the charged capacitor provided in the integrating circuit 10 to thereby initialize the voltage signal Vi.

In the illustrated embodiment, power for the control circuit 3 is supplied from a car battery (not shown) through a power supply protect circuit 14, a pnp type transistor 15 for turning on or off the power supply, and a constant voltage circuit 16. Here, the transistor 15 can be turned on by a door lock detect signal Sd to be given by an external circuit, for example, when a car door is locked in the on state of a system operation switch 17. Also, when the transistor 15 is on, that is, when the power supply of the control circuit 3 is put to work, an indicator 18 consisting of a light emitting diode is turned on.

Figure 2:
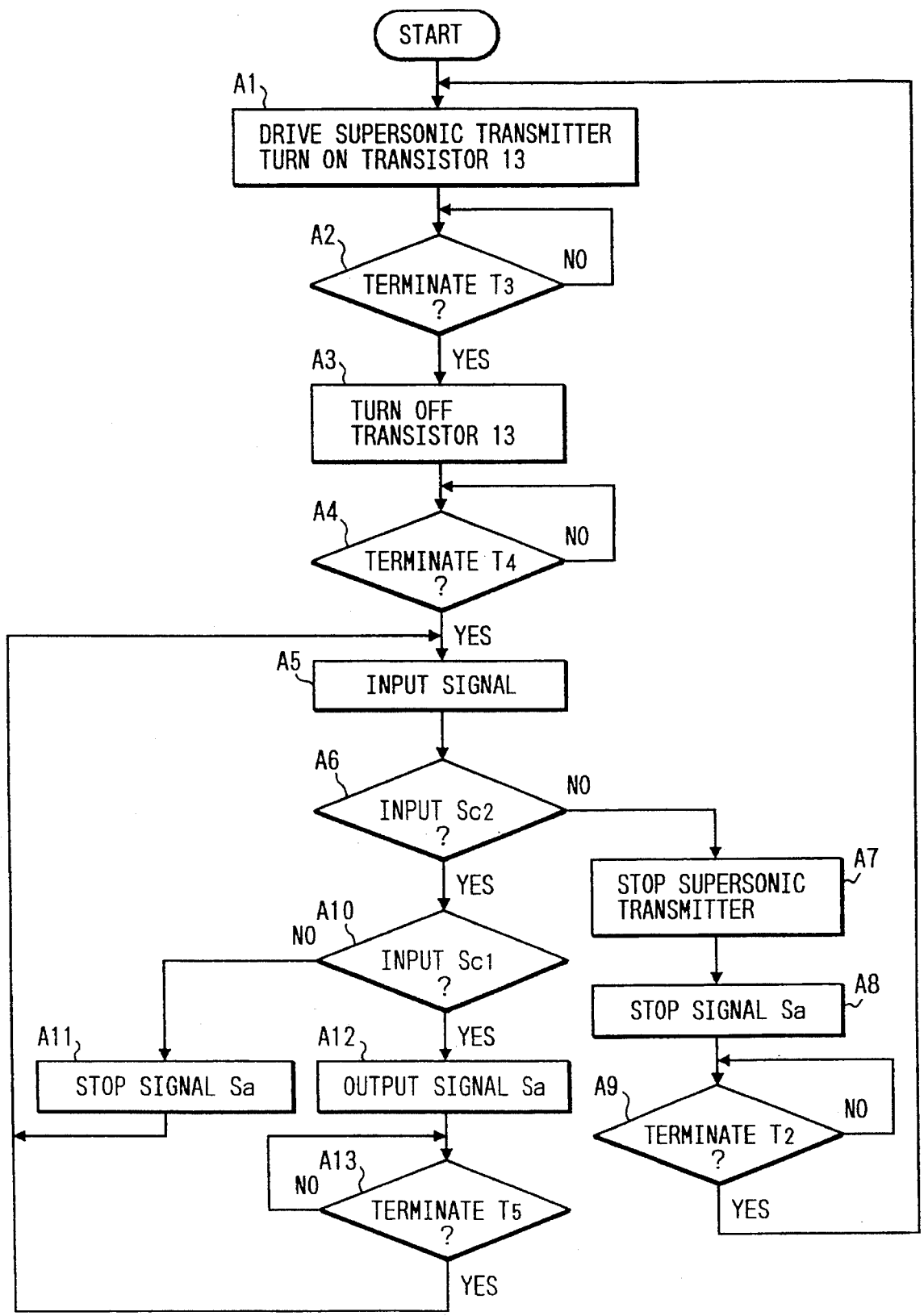
FIG. 2 is a flow chart of the control operations of a control circuit employed in the invention.
Figure 3:
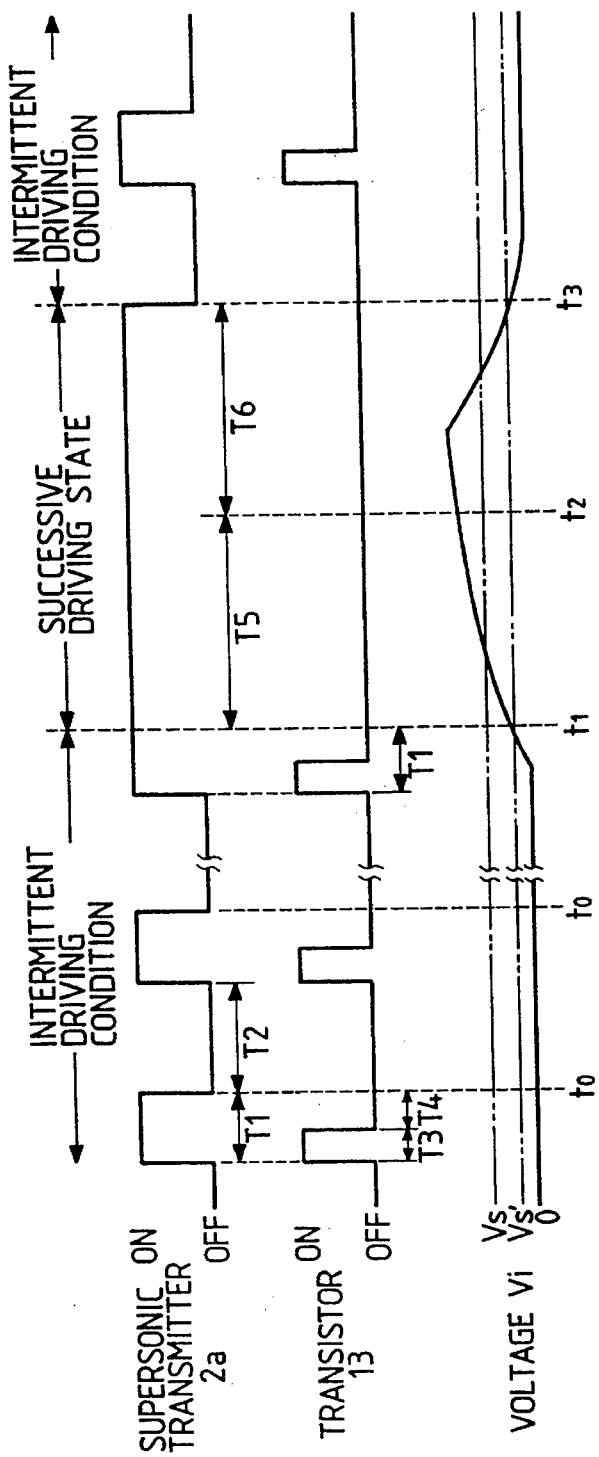
FIG. 3 is a timing chart used to explain the operation of the present embodiment of the invention.

Now, in FIG. 2, there is shown a flow chart of the contents of control processes to be performed by the control circuit 3. Description will be given blow of the control and their related operations with reference to FIGS. 2 and 3. Here, FIG. 3 is a timing chart which not only shows the driving and stop conditions of the supersonic transmitter 2a by means of ON and OFF respectively but also shows the on/off conditions of the transistor 13 and an embodiment of the changing condition of the voltage signal Vi output from the integrating circuit 11.

In FIG. 2, when the power supply is put to work, the control circuit 3 starts the driving of the supersonic transmitter 2a and also turns on the transistor 13 (Step A1). Responsive to this, supersonic waves are radiated from the supersonic transmitter 2a into the car interior 1b and, at the same time, the electric charges of the charged capacitor in the integrating circuit 10 are discharged.

After execution of the step A1, the process waits for a given time T3 (for example, 150 m sec.) (Step A2), during which the electric charges of the charged capacitor in the integrating circuit 10 are discharged completely and the voltage signal Vi output from the integrating circuit 10 is initialized. After the process waits for the time T3, the transistor 13 is turned off (Step A3), and the process further waits for a given time T4 (for example, 150 m sec.) (Step A4).

When the given time T4 has passed in accordance with the above-mentioned waiting, input signals are input to the input terminals Q1 and Q2 (Step A5), and it is checked whether the comparison signal Sc2 from the second comparator 12 is input (Step A6). If the comparison signal Sc2 is not input, that is, if the voltage signal Vi from the integrating circuit 10 is equal to or less than the auxiliary reference level Vs' set in the second comparator 12, the driving of the supersonic transmitter 2a is caused to stop (Step A7). Next, in Step A8, an operation to output the alarm signal Sa from the output terminal D2 is caused to stop and, in Step A9, the process waits for a given time T2 (for example, 500 m seconds). After that, the process goes back to Step A1.

Therefore, while the voltage signal Vi from the integrating circuit 10 is equal to or less than the auxiliary reference level Vs', that is, while there exists no person who intrudes on the car interior 1b, as shown in FIG. 3, the supersonic transmitter 2a is driven intermittently every T1 (T1 =T3+T4=300 m sec.) at a given cycle $\Delta T$ ($\Delta T$=T2+T3+T4 =800 m sec.)

(duty ratio =⅜). Also, while the given time T3 (150 m sec.) has passed in a beginning time period of such intermittent driving, the voltage signal Vi from the integrating circuit 10 is invalidated in accordance with the turn-on of the transistor 13 and also, at the respective timings (In FIG. 3, the timings are designated by t0) just before the intermittent driving is stopped, the condition of the voltage signal Vi is checked by means of the first and second comparators 11 and 12.

On the other hand, if the comparison signal Sc2 is input (in Step A6, if yes), that is, if the voltage signal Vi exceeds the auxiliary reference level Vs', a check is made whether the comparison signal Sc1 from the first comparator 11 is present or absent (Step A10). If the comparison signal Sc1 is not input, that is, if the voltage signal Vi from the integrating circuit 10 is equal to or less than the reference level Vs set in the first comparator 11, an operation to output the alarm signal Sa from the output terminal D2 is then stopped in Step A11, and the process returns back to Step A5.

On the other hand, if the comparison signal Sc1 is input (in Step A10, if yes), that is, if the voltage signal Vi goes beyond the reference level Vs, then in Step A12 outputting the alarm signal Sa from the output terminal D2 is started and, thereafter, the process waits for a given time T5 (for example, 10 sec.) (Step A13). After lapse of the wait time T5, the process goes back to Step A5.

Accordingly, if the voltage signal Vi from the integrating circuit 10 goes beyond the auxiliary reference level Vs', as shown in FIG. 3, at a check timing t1 of the voltage signal Vi, the supersonic transmitter 2a is switched over to its successive driving state and, at the same time, it is checked each time (at timing t2 and t3) the time T5 passes whether comparison signals Sc1 and Sc2 are input. If the comparison signal Sc1 is input once, that is, if any person intrudes on the car interior 1b, then the alarm signal Sa is output at least for 10 seconds and, at the same time, such outputting condition of the alarm signal Sa is allowed to continue at least until the inputting of the comparison signal Sc1 is stopped. If the inputting of the comparison signal Sc2 is stopped at the check timing t3, the supersonic transmitter 2a is switched into its intermittent driving condition. In FIG. 3, a scale relating to the time T5 is shown in a reduced state.

In summary, according to the structure of the above-mentioned present embodiment, the driving of the supersonic sensor 2 is executed intermittently at a duty ratio of ⅜, so that the consumption of power can be reduced. Also, although in the beginning time period of the supersonic sensor 2 there occurs a phenomenon that the output frequency is unstabilized, the voltage signal Vi from the integrating circuit 10 is invalidated until the given time T3 (150 m sec.) has passed after the beginning time period of the driving of the supersonic sensor 2. The invention thus eliminates the possibility that the operation to detect an intruder can be unstabilized because the level of the voltage signal Vi goes beyond the reference level Vs. Also, after lapse of the invalidated time of the voltage signal Vi, when the voltage signal Vi is equal to or more than the auxiliary reference level Vs' lower than the reference level Vs, the supersonic sensor 2 is switched into its successive driving condition, so that the intruder detect operation can be executed positively.

As can be clearly understood from the foregoing description, according to the invention, there is provided a vehicle alarm signal generation device which includes an integrating circuit used to integrate a beat frequency signal corresponding to a difference between the frequencies of radiated and received supersonic waves by means of a supersonic sensor to thereby generate a voltage signal and in which detection of an intruder on the interior of a vehicle is executed in accordance with comparison between a voltage signal from the integrating circuit and a reference level. That is, according to the invention, in the above vehicle alarm signal generation device, the supersonic sensor is driven intermittently, the voltage signal is invalidated for a given time in the beginning time period of the respective drivings of the supersonic sensor, and the supersonic sensor is switched over to its successive driving condition when the voltage signal is equal to or higher than an auxiliary reference level lower than the reference level after lapse of the invalidated time of the voltage signal, so that the reduction of the consumption of power can be realized without unstabilizing the intruder detect operation.

What is claimed is:

1. An alarm signal generation device comprising:

a supersonic sensor including a supersonic transmitter for radiating supersonic waves and a supersonic receiver for receiving the radiated supersonic waves;

an integrating circuit for integrating a beat frequency signal corresponding to a difference between the frequencies of the radiated and received supersonic waves to thereby to generate a voltage signal; and a control circuit for generating an alarm signal when the voltage signal reaches a reference level, the control circuit driving said supersonic sensor intermittently in response to the voltage signal when said voltage signal reaches an auxiliary level lower than said reference level and invalidating said voltage signal for an invalidation time period in a beginning time period for each intermittent driving of said supersonic sensor.

2. An alarm signal generation device as claimed in claim 1, wherein the integrating circuit includes a comparator for integrating the beat frequency signal.

3. An alarm signal generation device as claimed in claim 2, further comprising:

first comparator for comparing the voltage signal with a first predetermined reference level to generate a first comparison signal which is transmitted to the control circuit when the voltage signal is more than the first predetermined reference level; and second comparator for comparing the voltage signal with a second predetermined reference level to generate a second comparison signal which is transmitted to the control circuit when the voltage signal is more than the second predetermined reference level, the second reference level being not more than the first reference level.

* * * * *

UNITED STATES PATENT AND TRADEMARK OFFICE
CERTIFICATE OF CORRECTION

PATENT NO. : 5,483,219
DATED : January 09, 1996
INVENTOR(S) : Hisashi AOKI et al It is certified that error appears in the above-indentified patent and that said Letters Patent is hereby corrected as shown below:

In Claim 1, Col. 6, line 32, before "thereby", delete "to" (first occurrence).

ON THE TITLE PAGE:
Item [54] Title: "ALARM SIGNAL GENERATION DEVICE FOR A VEHICLE" should read -- SUPERSONICALLY DRIVEN ALARM SIGNAL GENERATION DEVICE FOR A VEHICLE --.

Signed and Sealed this

Twenty-ninth Day of October 1996

Attest:

BRUCE LEHMAN

*Attesting Officer*   *Commissioner of Patents and Trademarks*